United States Patent
Wu

(10) Patent No.: US 6,684,877 B2
(45) Date of Patent: Feb. 3, 2004

(54) BARBECUE DEVICE

(75) Inventor: Tsan-Kuen Wu, Tainan Hsien (TW)

(73) Assignee: Tsann Kuen USA Inc., Pasadena, CA (US)

( * ) Notice: Subject to any disclaimer, the term of this patent is extended or adjusted under 35 U.S.C. 154(b) by 70 days.

(21) Appl. No.: 10/007,933

(22) Filed: Dec. 7, 2001

(65) Prior Publication Data

US 2003/0106546 A1 Jun. 12, 2003

(51) Int. Cl.[7] .............................. A47J 37/00; F24C 3/14
(52) U.S. Cl. ...................... 126/41 R; 126/38; 126/9 R; 126/40; 126/305
(58) Field of Search ................................ 126/41 R, 38, 126/9 R, 9 B, 25 R, 40, 50, 276, 304 R, 305, 306, 37 R, 37 A; 99/467, 482; 248/129, 250

(56) References Cited

U.S. PATENT DOCUMENTS

| | | | | |
|---|---|---|---|---|
| 2,742,033 A | * | 4/1956 | Bramming | 126/38 |
| 3,008,463 A | * | 11/1961 | Frank | 126/9 R |
| 3,124,057 A | * | 3/1964 | Kiser | 126/9 R |
| 3,386,430 A | * | 6/1968 | Linstead | 126/25 A |
| 4,210,118 A | * | 7/1980 | Davis et al. | 126/25 R |
| 4,949,701 A | * | 8/1990 | Krosp et al. | 126/41 R |
| 6,439,221 B1 | * | 8/2002 | Ward et al. | 126/25 R |
| 6,513,515 B1 | * | 2/2003 | Wu | 126/41 R |

FOREIGN PATENT DOCUMENTS

| | | | | |
|---|---|---|---|---|
| DE | 28 00 857 A1 | * | 7/1979 | A47J/37/07 |
| JP | 8-178294 A | * | 9/1995 | F24C/1/16 |

* cited by examiner

*Primary Examiner*—Josiah Cocks
(74) *Attorney, Agent, or Firm*—Ostrolenk, Faber, Gerb & Soffen, LLP

(57) ABSTRACT

A barbecue device includes front and rear leg members disposed under and pivoted to a support plate. The leg members are pivotable relative to the support plate for moving between a first position, in which lower ends of the leg members are moved away from each other, and a second position, in which the lower ends of the leg members are moved toward each other. A cook unit is disposed removably on the support plate. The support plate and the leg members cooperatively define an accommodating space thereamong for receiving the cook unit when the cook unit is removed from the support plate. A retaining unit is mounted on one of the leg members, and engages releasably the other one of the leg members for retaining the leg members at the second position.

7 Claims, 8 Drawing Sheets

BARBECUE DEVICE

BACKGROUND OF THE INVENTION

1. Field of the Invention

The present invention relates to a barbecue device, more particularly to a barbecue device which can be converted into a compact state that occupies a relatively small amount of storage space.

2. Description of the Related Art

A conventional barbecue device generally includes a cook unit installed with a barbecue grill, and a leg unit for supporting the cook unit above aground surface. The leg unit may be installed with wheels to permit movement of the barbecue device along the ground surface, and the cook unit may be removable from the leg unit when the barbecue device is not in use. However, the cook unit and the leg unit occupy individual storage spaces having a relatively large combined volume when the barbecue device is not in use, and inconveniences during the transport of the barbecue device thus exist.

SUMMARY OF THE INVENTION

Therefore, the main object of the present invention is to provide a barbecue device which occupies a relatively small amount of storage space and which facilitates the transport thereof.

Accordingly, the barbecue device of the present invention includes a support unit, a cook unit, and a retaining unit. The support unit includes a horizontal support plate with front and rear end portions which are opposite to each other in a longitudinal direction, and front and rear leg members. Each of the front and rear leg members has an upper end mounted pivotally on a respective one of the front and rear end portions of the support plate for pivoting about a respective horizontal axis transverse to the longitudinal direction, and a lower end adapted to be disposed on a ground surface. The front and rear leg members are pivotable relative to the support plate for moving between a first position, in which the lower ends of the front and rear leg members are moved away from each other, and a second position, in which the lower ends of the front and rear leg members are moved toward each other. The cook unit is disposed removably on the support plate, and is supported by the support unit when the front and rear leg members are disposed in the first position. The support plate and the front and rear leg members cooperatively define an accommodating space thereamong for receiving the cook unit when the cook unit is removed from the support plate. The retaining unit has a first end mounted on one of the front and rear leg members, and a second end opposite to the first end. The second end of the retaining unit engages releasably the other one of the front and rear leg members when the front and rear leg members are moved to the second position, thereby retaining the front and rear leg members at the second position.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
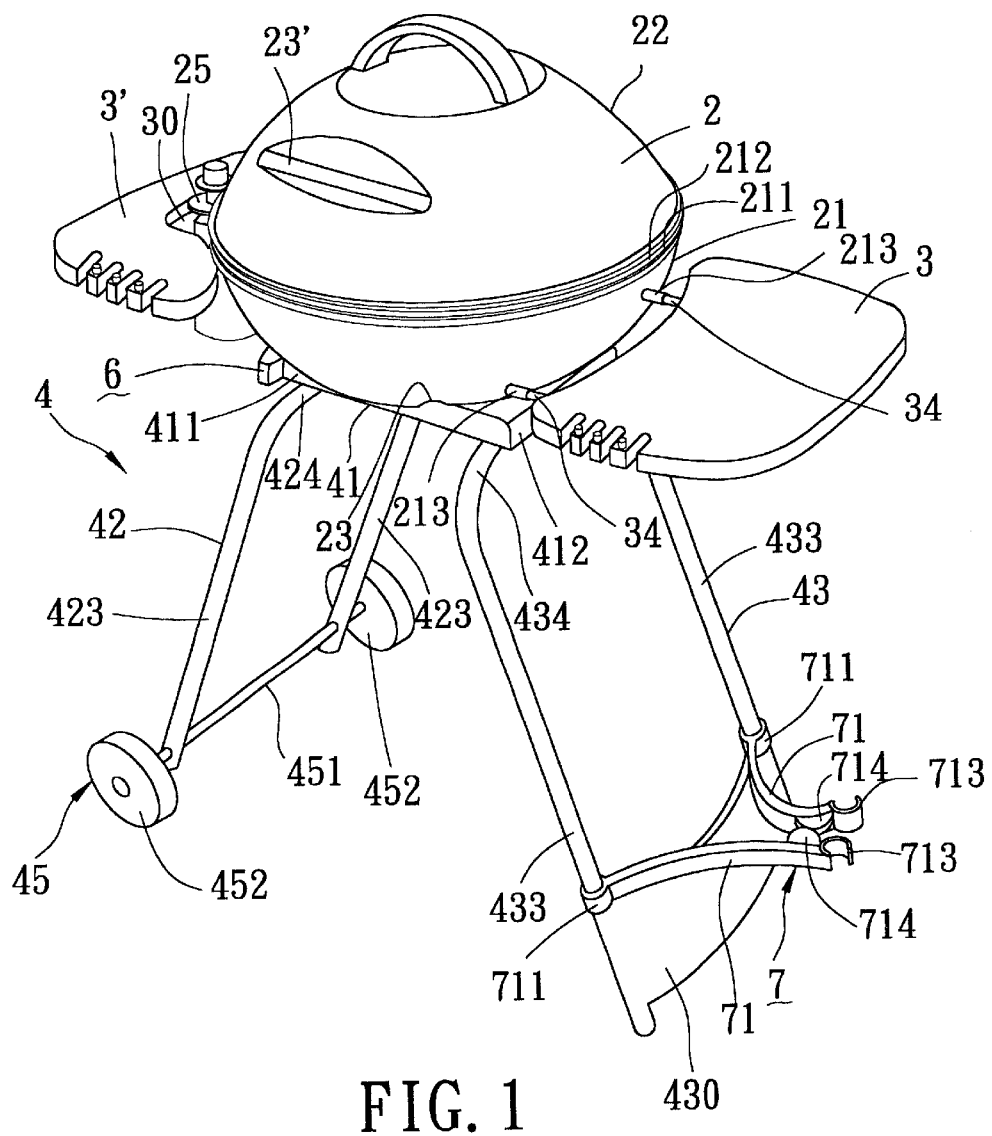
FIG. 1 is a perspective view of a preferred embodiment of the barbecue device of the present invention.
Figure 2:
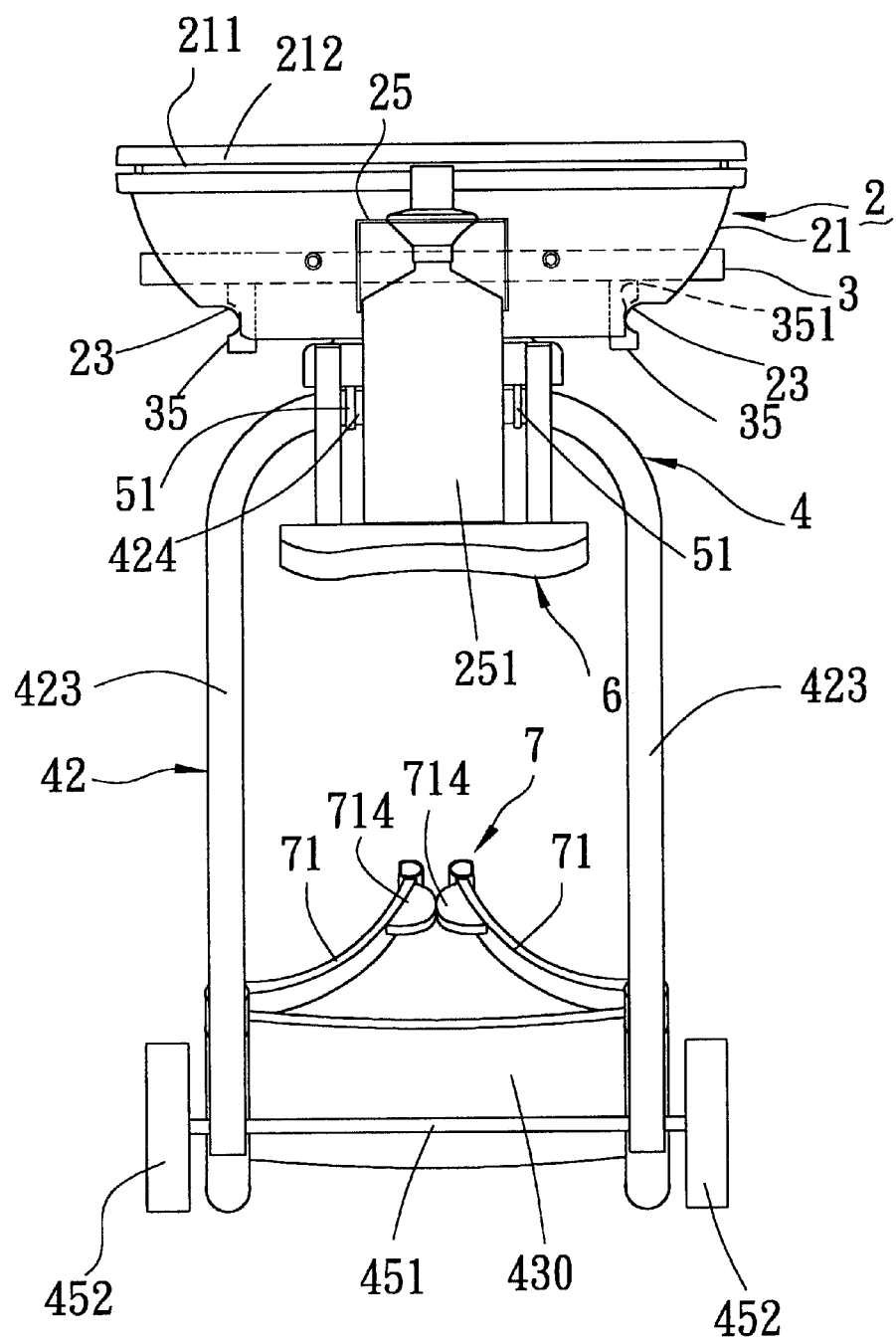
FIG. 2 is a front view of the preferred embodiment in a state of use, where a side panel and a top cover are removed.
Figure 3:
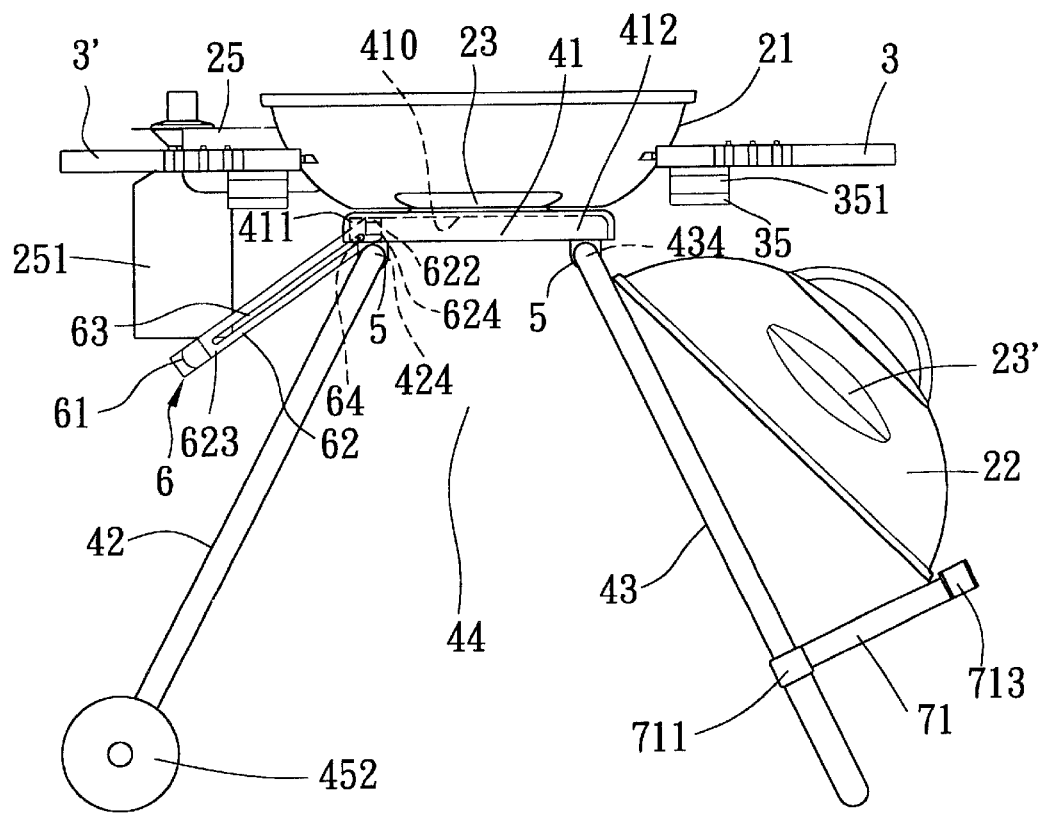
FIG. 3 is a side view of the preferred embodiment in the state of use.

Referring to FIGS. 1 to 3, the preferred embodiment of the barbecue device of the present invention is shown to include a support unit 4, a cook unit 2, a pair of side panels 3, 3', a handle frame 6, and a retaining unit 7.

Figure 4:
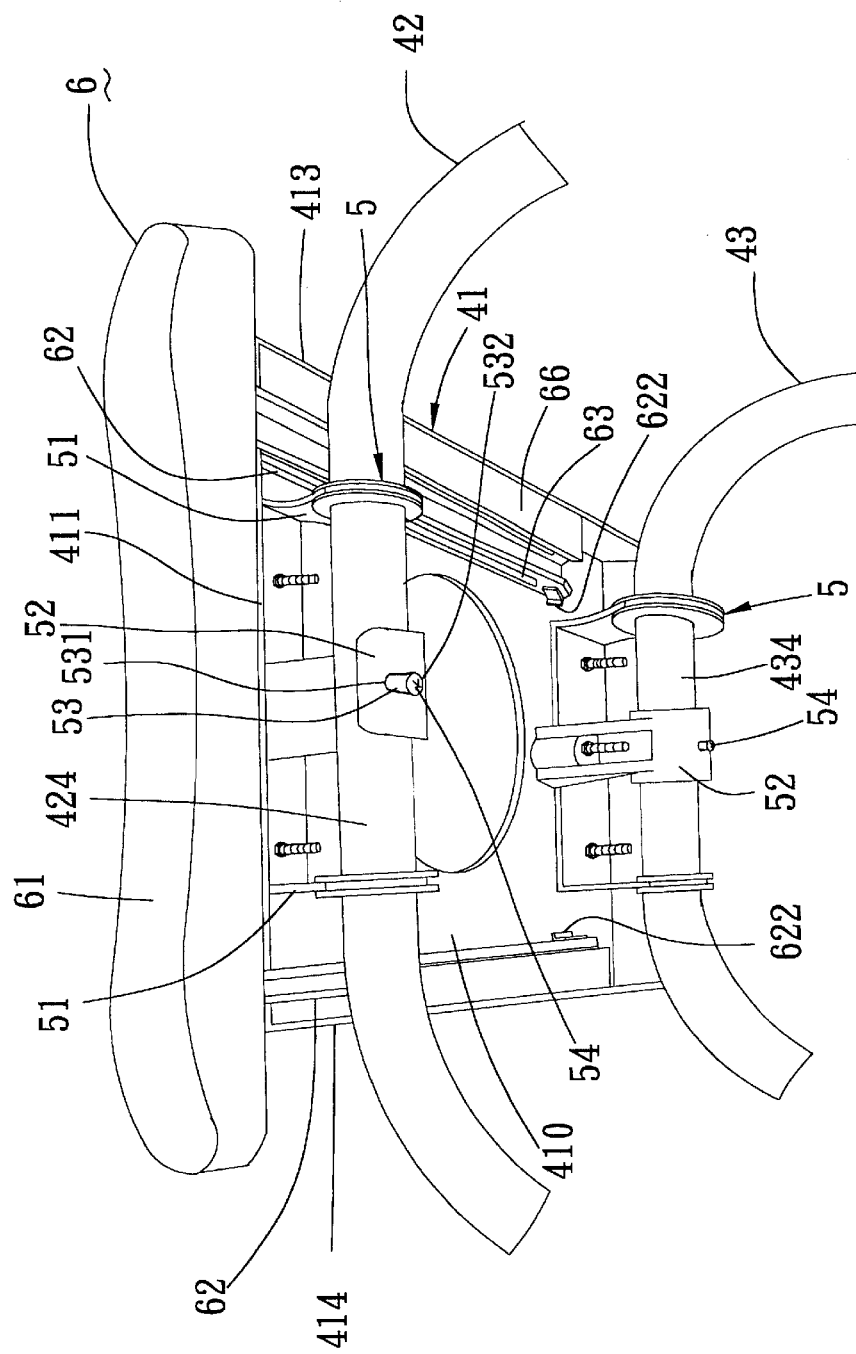
FIG. 4 is a fragmentary perspective view showing a bottom side of a support plate of the preferred embodiment.

The support unit 4 includes a horizontal support plate 41 which is rectangular in shape with front and rear end portions 411, 412 that are opposite to each other in a longitudinal direction, and front and rear leg members 42, 43 with upper ends mounted pivotally and respectively on the front and rear end portions 411, 412 of the support plate 41 and lower ends adapted to be supported on a ground surface. The support plate 41 and the front and rear leg members 42, 43 cooperatively define a receiving space thereamong. Each of the front and rear leg members 42, 43 has an inverted U-shaped frame section including a horizontal rod 424, 434, and a pair of upright rods 423, 433 that extend downwardly and respectively from two opposite ends of the horizontal rod 424, 434. The lower end of the front leg member 42 is installed with a wheel unit 45 which includes a wheel axle 451 mounted on and extending transversely between lower ends of the upright rods 423, and a pair of wheel members 452 mounted on two opposite ends of the wheel axle 451 and adapted to be in contact with the ground surface. The rear leg member 43 has a plate body 430 extending between and interconnecting lower ends of the upright rods 433. A pair of pivot units 5 are mounted on a bottom side of the support plate 41 at a respective one of the front and rear end portions 411, 412 for mounting the horizontal rods 424, 434 of the front and rear leg members 42, 43 pivotally on the front and rear end portions 411, 412 of the support plate 41. Referring to FIG. 4, each of the pivot units 5 includes an aligned pair of first pivot sleeves 51 secured to the bottom side of the support plate 41. The first pivot sleeves 51 have the horizontal rod 424, 434 of a respective one of the front and rear leg members 42, 43 extending rotatably therethrough such that the front and rear leg members 42, 43 are pivotable about axes of the horizontal rods 424, 434, which are transverses to the longitudinal direction, for moving between a first position, in which the lower ends of the front and rear support members 42, 43 are moved away from each other, and a second position, in which the lower ends of the front and rear support members 42, 43 are moved toward each other. Each of the pivot units 5 further has a second pivot sleeve 52 secured to the bottom side of the support plate 41 and disposed between the first pivot sleeves 51. The second pivot sleeve 52 is formed with an elongated radial limiting hole 53 with first and second hole ends 531, 532 which are opposite to each other in the longitudinal direction. The horizontal rod 424, 434 of each of the front and rear leg members 42, 43 extends rotatably through the second pivot sleeve 52 of a respective one of the pivot units 5, and is formed with a radial pin 54 that extends through the limiting hole 53 in the second pivot sleeve 52. The radial pin 54 is movable together with the horizontal rod 424, 434 within the limiting hole 53, and is limited between the first and second hole ends 531, 532 of the limiting hole 53 for limiting pivoting movement of the respective one of the front and rear leg members 42, 43 within a predetermined angular range when the respective one of the front and rear leg members 42, 43 moves between the first and second positions.

Figure 7:
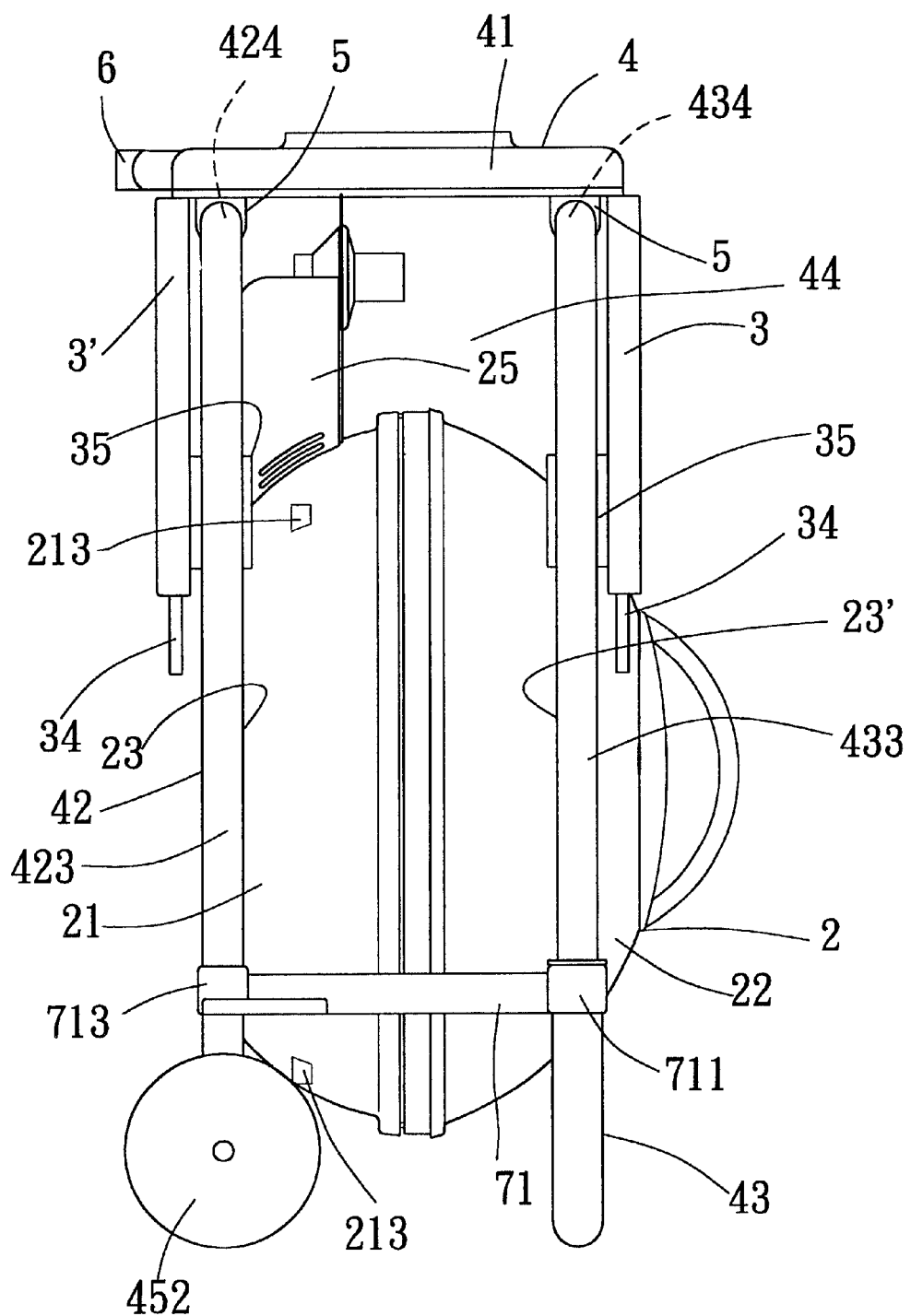
FIG. 7 is a side view of the preferred embodiment in a compact state, where a cook unit is retained between the front and rear leg members.

The cook unit 2 is disposed removably on the support plate 41 so as to be supported by the support unit 4 when the front and rear leg members 42, 43 are turned away to the first position. The cook unit 2 includes a bowl-shaped cooking base 21, a cooking plate 212 mounted on a top side of the cooking base 21, and a dome-shaped top cover 22 for covering the cooking base 21. A slit 211 is formed between the cooking plate 212 and an upper edge of a surrounding wall of the cooking base 21 to permit release of residual fuel gas from the cooking base 21 for safety considerations. The cooking base 21 has an outer wall surface formed with two pairs of tubular sleeves 213 for mounting the side panels 3, 3' thereon. Each of the side panels 3, 3' has a pair of mounting shafts 34 that extend removably into an adjacent pair of the tubular sleeves 213 for mounting removably on the cooking base 21. The cooking base 21 is further mounted with a bracket 25 for retaining a gas cylinder 251. One of the side panels 3' has an indented part 30 for accommodating the bracket 25. The outer wall surface of the cooking base 21 is further formed with a pair of elongated positioning grooves 23. The top cover 22 has an outer wall surface that is similarly formed with a pair of elongated positioning grooves 23'. Each of the side panels 3, 3' has a bottom side formed with a pair of clamping members 35 that are each formed with a clamping groove 351 complementing with a part of the cross-section of each of the upright rods 423, 433 of the front and rear leg members 42, 43. The side panels 3, 3', when being removed from the cooking base 21, can be retained respectively on the front and rear leg members 42, 43, by turning the side panels 3, 3' upright and disposing the clamping members 35 of each of the side panels 3, 3' between the upright rods 423, 433 of a respective one of the front and rear leg members 42, 43 such that the clamping grooves 351 in the clamping members 35 engage releasably and respectively the upright rods 423, 433, as shown in FIG. 7.

Figure 6:
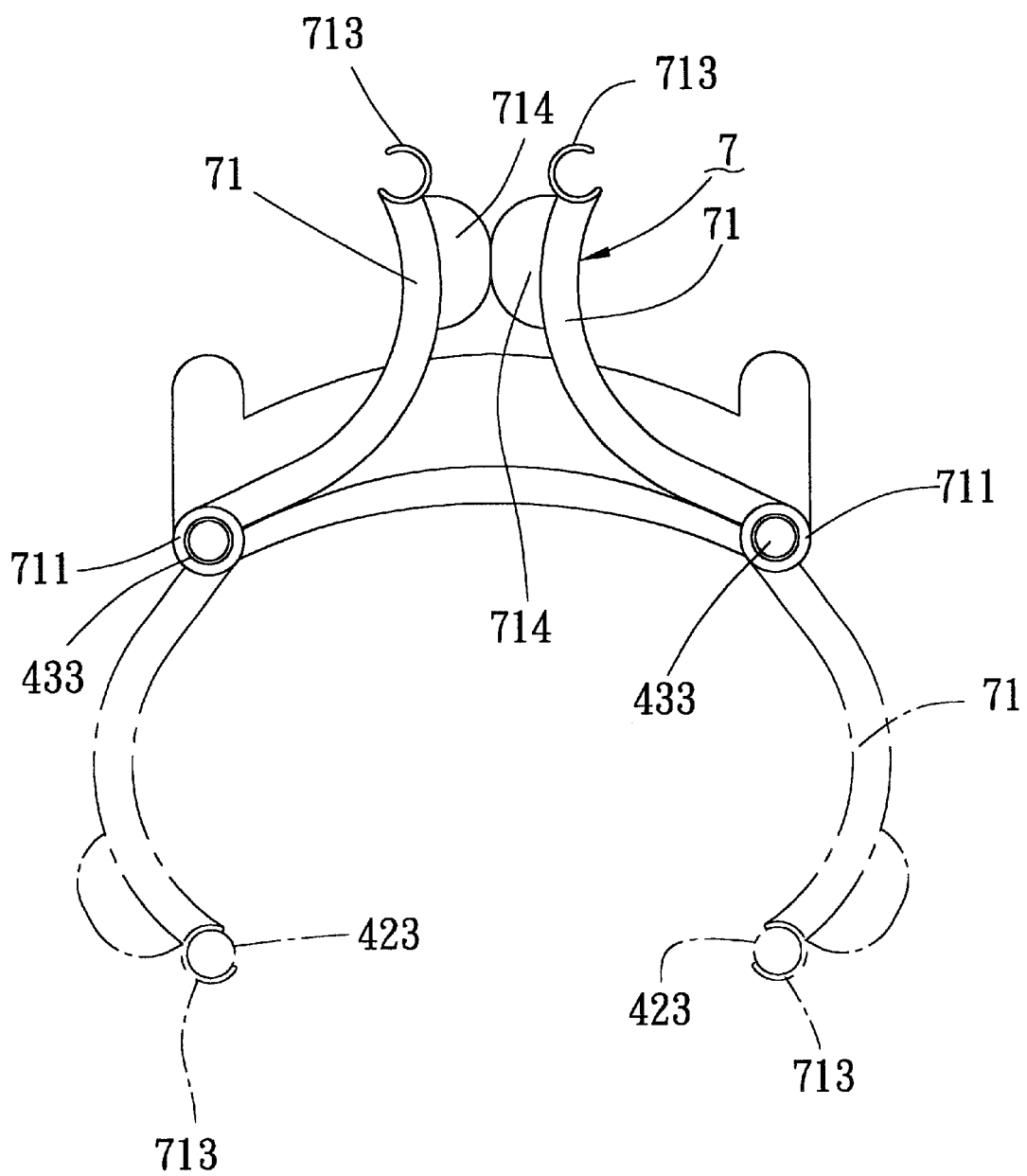
FIG. 6 is a schematic top view showing how a retaining unit is operated to engage a rear leg member with a front leg member of the preferred embodiment.

Referring to FIGS. 1 and 6, the retaining unit 7 is mounted on the rear leg member 43 immediately above the plate body 430. The retaining unit 7 includes a pair of retaining arms 71, each of which has a first end formed as a tubular sleeve 711 that is sleeved rotatably on a respective one of the upright rods 433 of the rear leg member 43, and a second end opposite to the first end and formed with a C-shaped clamping ring 713. Each of the retaining arms 71 is turnable about the respective one of the upright rods 433 for moving toward and away from the front leg member 42. The clamping ring 713 on the second end of the retaining arm 71 is clamped releasably at a corresponding one of the upright rods 423 of the front leg member 42 when turning toward the front leg member 42 while the front and rear leg members 42, 43 are moved to the second position, thereby retaining the front and rear leg members 42, 43 in the second position. The second end of each of the retaining arms 71 is further formed with an abutment block 714 adjacent to the clamping ring 713. The abutment blocks 714 abut against each other when the retaining arms 71 are turned away from the front leg member 42.

Figure 5:
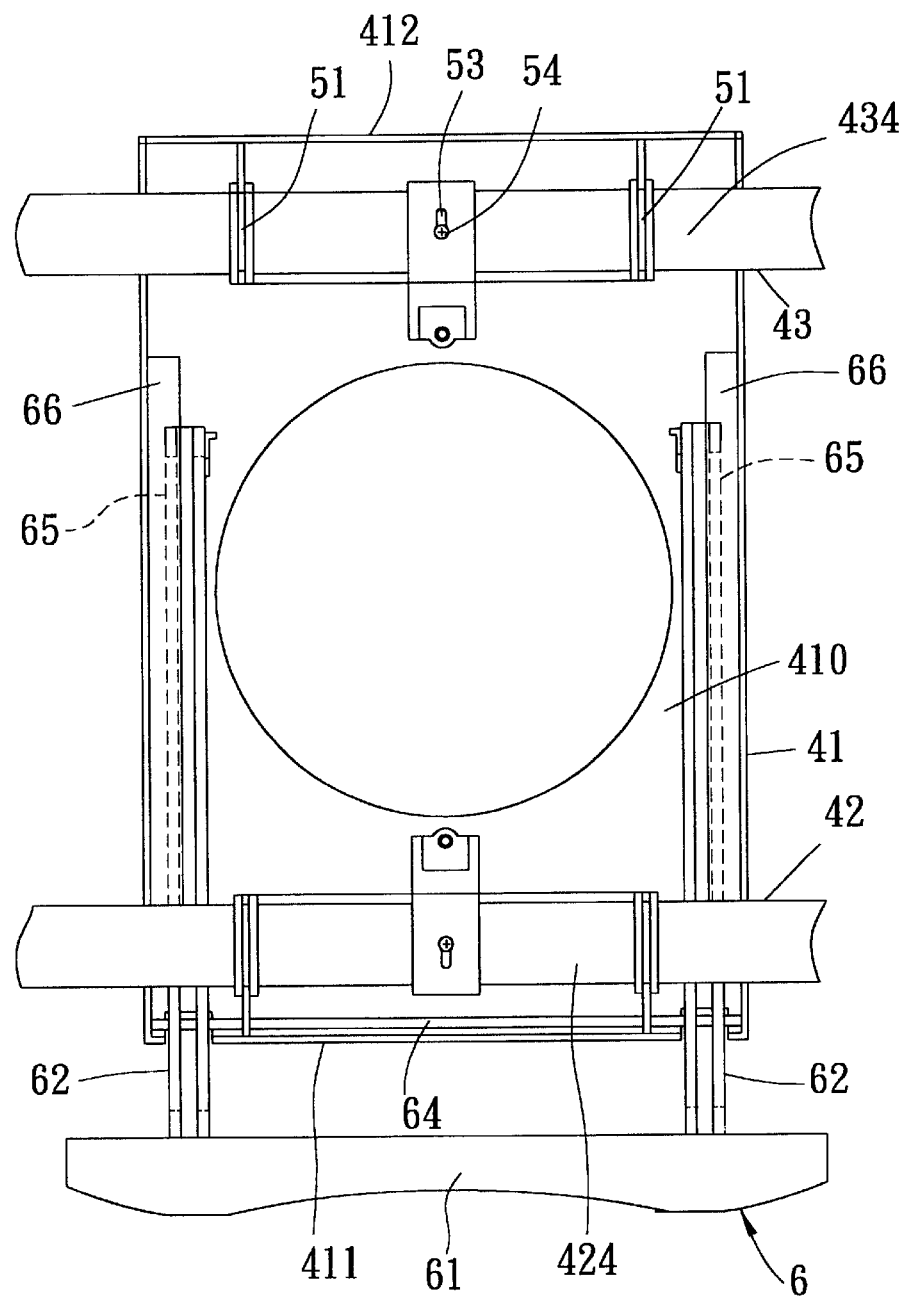
FIG. 5 is a fragmentary bottom view of the preferred embodiment.

Referring to FIGS. 3 to 5, the handle frame 6 is mounted on the bottom side of the support plate 41. The bottom side of the support plate 41 has a bottom surface 410. A pair of horizontal elongated plates 66 are disposed below and are spaced-apart from the bottom surface 410. The elongated plates 66 are fixed to left and right longitudinal side walls 413, 414 of the support plate 41. The elongated plates 66 cooperate with the bottom surface 410 of the support plate 41 to define a pair of slide channels 65 that extend in the longitudinal direction between the front and rear end portions 411, 412 of the support plate 41. A retaining rod 64, that extends in the transverse direction, is fixed to the support plate 41 below the bottom surface 410, and is disposed at the front end portion 411 of the support plate 41. The handle frame 6 includes a pair of slide rods 62 and a handle bar 61 extending between and interconnecting the slide rods 62. Each of the slide rods 62 has a front connecting end 623 connected to the handle bar 61, a rear distal end 624 formed with an abutment plate 622, and an elongated slot 63 extending between the connecting end 623 and the distal end 624. The retaining rod 64 extends through the elongated slot 63 of each of the slide rods 62. The slide rods 62 extend respectively and slidably into the slide channels 65 such that the handle frame 6 is movable between a retracted position, in which the slide rods 62 are retracted into the slide channels 65 and the handle bar 61 is disposed adjacent to the front end portion 411 of the support plate 41, and an extended position, in which the slide rods 62 extend forwardly from the slide channels 65 and the handle bar 61 is disposed distal from the front end portion 411 of the support plate 41. When the handle frame 6 moves to the extended position, the retaining rod 64 abuts against a rear periphery of the elongated slot 63 of each of the slide rods 62 to prevent removal of the slide rods 62 from the support plate 41, thereby retaining the handle frame 6 on the support plate 41. The abutment plate 622 on each of the slide rods 62 is inclined with respect to the longitudinal direction of the respective one of the slide rods 62. At the extended position, the handle frame 6 is turnable about an axis of the retaining rod 64 such that the position of the handle bar 61 is lowered while the positions of the distal ends 624 of the slide rods 62 are raised so as to enable the abutment plates 622 to abut against the bottom surface 410 of the support plate 41 for supporting the handle frame 6 at the extended position, as shown in FIG. 3.

In a state of use, the front and rear leg members 42, 43 are turned outwardly to the first position. The retaining arms 71 are turned away from the front leg member 42, and abut against each other at the abutment blocks 714 (see FIG. 2). The top cover 22, when being removed from the cooking base 21, could be disposed on the retaining arms 71 for leaning against the upright rods 433 of the rear leg member 43. The handle frame 6 is pulled forwardly to the extended position, and is turned about the retaining rod 64 for positioning at the extended position in a downwardly inclined state, where the gas cylinder 215 may be supported on the handle frame 6.

Referring to FIG. 7, after use, the barbecue device of the present invention may be converted into a compact state to facilitate storage and transport thereof. To conduct the conversion, the side panels 3, 3' are first removed from the cooking base 21. The cook unit 2 is removed from the top of the support plate 41 and is disposed uprightly between the front and rear leg members 42, 43. The front and rear leg members 42, 43 are then turned about the axes of the horizontal rods 424, 434, respectively, for moving to the second position, thereby allowing the upright rods 423 on the front leg member 42 to engage the positioning grooves 23 in the cooking base 21 and allowing the upright rods 433 on the rear leg member 43 to engage the positioning grooves 23' in the top cover 22. The retaining arms 71 are turned toward the front leg member 42 and engage the front leg member 42 by means of the clamping rings 713 that are clamped at the upright rods 423 of the front leg member 42. At this time, the retaining arms 71 are disposed immediately under the cook unit 2 for supporting the cook unit 2 thereon. Finally, the side panels 3, 3' are oriented upright and are retained respectively on the front and rear leg members 42, 43 by engaging the clamping members 35 with the upright rods 423, 433 of the front and rear leg members 42, 43.

Alternatively, to facilitate the converting operation, the upright rods 423 of the front leg member 42 may be disposed substantially horizontally on the ground surface after the cook unit 2 is removed from the top of the support plate 41. The cook unit 2 is then disposed horizontally on the upright rods 423, which are oriented horizontally at this time, and the rear leg member 43 is moved toward the front leg member 42 and engages the front leg member 42 by means of the retaining arms 7.

Figure 8:
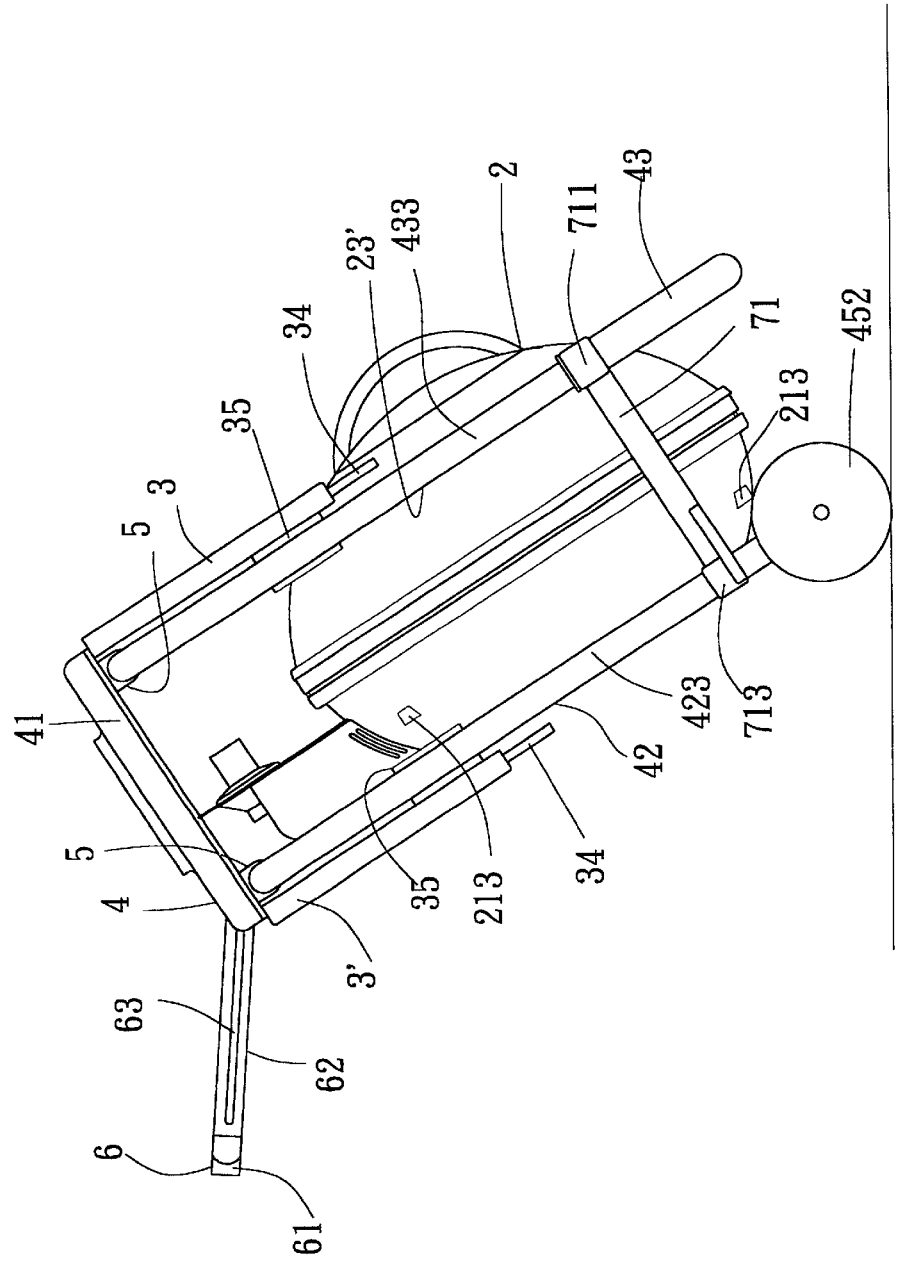
FIG. 8 is a side view of the preferred embodiment in the compact state when moved along a ground surface.

Referring to FIG. 8, after being converted into the compact state, the barbecue device can be moved along the ground surface by virtue of the wheel members 452 that are in rolling contact with the ground surface. The handle frame 6 could be drawn from the support plate 41, and the handle bar 61 could be gripped for pulling the barbecue device so as to move the barbecue device along the ground surface.

It has thus been shown that, by simply receiving the cook unit 2 in the accommodating space 44 defined among the support plate 41 and the front and rear leg members 42, 43, the barbecue device of the present invention can be converted into a compact state in which a relatively small storage space is required and in which movement of the barbecue device along the ground surface can be facilitated.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A barbecue device comprising:

a support unit including a horizontal support plate with front and rear end portions which are opposite to each other in a longitudinal direction, and front and rear leg members, each of said front an rear leg members having an upper end mounted pivotally on a respective one of said front ad rear end portions of aid support plate for pivoting about a respective horizontal axis transverse to said longitudinal direction, and a lower end adapted to be disposed on a ground surface, said front and rear leg members being pivotable relative to said support plate for moving between a first position, in which said lower ends of said front and rear leg members are moved away from each other, and a second position, in which said lower ends of said front and rear leg members are moved toward each other;

said support plate is provided with a pair of pivot units respectively adjacent to said front and rear end portions, each of said pivot units including a pivot sleeve secured to said support plate and formed with a limiting hole that has first and second hole ends which are opposite to each other in the longitudinal direction, each of said front and rear leg members having a horizontal rod extending in a transverse direction transverse to said longitudinal direction, and two upright rods extending downwardly and respectively from two opposite ends of said horizontal rod, said horizontal rod extending rotatably through said pivot sleeve and having a radial pin that extends through said limiting hole, said radial pin being movable together with said horizontal rod within said limiting hole and being limited between said first and second hole ends for limiting pivoting movement of the respective one of said front and rear leg members within a predetermined angular range when the respective one of said front and rear leg members moves between said first and second positions;

a cook unit disposed removably on said support plate and supported by said support unit when said front and rear leg members are disposed in the first position;

said support plate and said front and rear leg members cooperatively defining an accommodating space thereamong for receiving said cook unit when said cook unit is removed from said support plate; and a retaining unit having a first end mounted on one of said front an rear leg members and a second end opposite to said first end, said second end of said retaining unit engaging releasably the other one of said front and rear leg members when said front and rear leg members are moved to the second position, thereby retaining said front and rear leg members at said second position.

2. The barbecue device as claimed in claim 1, wherein said retaining unit is disposed under said cook unit for supporting said cook unit when said cook unit is received in said accommodating space while said front and rear leg members are retained in the second position.

3. A barbecue device comprising:

a support unit including a horizontal support plate with front and rear end portions which are opposite to each other in a longitudinal direction, and front and rear leg members, each of said front an rear leg members having an upper end mounted pivotally on a respective one of said front ad rear end portions of aid support plate for pivoting about a respective horizontal axis transverse to said longitudinal direction, and a lower end adapted to be disposed on a ground surface, said front and rear leg members being pivotable relative to said support plate for moving between a first position, in which said lower ends of said front and rear leg members are moved away from each other, and a second position, in which said lower ends of said front and rear leg members are moved toward each other;

each of said front and rear leg members has a horizontal rod extending in a traverse direction transverse to said longitudinal direction, and two upright rods extending downwardly ad respectively from two opposite ends of said horizontal rod;

a cook unit disposed removably on said support plate and supported by said support unit when said front and rear leg members are disposed in the first position;

said support plate and said front and rear leg members cooperatively defining an accommodating space thereamong for receiving said cook unit when said cook unit is removed from said support plate; and a retaining unit having a first end mounted on one of said front an rear leg members and a second end opposite to said first end, said second end of said retaining unit engaging releasably the other one of said front and rear leg members when said front and rear leg members are moved to the second position, thereby retaining said front and rear leg members at said second position, said retaining unit including a pair of retaining arms, each of which has a first end formed as a tubular sleeve that is sleeved rotatably on a respective one of said upright rods of said rear leg member, and said second end opposite to said first end, each of said retaining arms being turnable about the respective one of said upright rods of said rear leg member for moving said second end toward and away from said front leg member, said second end of each of said retaining arms being formed with a clamping ring which is clamped releasably at a corresponding one of said upright rods of said front leg member when said retaining arm is turned toward said front leg member while said front and rear leg members are moved to the second position, thereby retaining said front and rear leg members at the second position.

4. The barbecue device as claimed in claim 3, further comprising a pair of side panels mounted removably on said cook unit, each of said side panels being formed with a pair of clamping members for engaging removably said upright rods of a respective one of said front and rear leg members so as to retain said side panels on said front and rear leg members, respectively, when said side panels are removed from said cook unit.

5. A barbecue device comprising:

a support unit including a horizontal support plate with front and rear end portions which are opposite to each other in a longitudinal direction, and front and rear leg members, each of said front an rear leg members having an upper end mounted pivotally on a respective one of said front ad rear end portions of aid support plate for pivoting about a respective horizontal axis transverse to said longitudinal direction, and a lower end adapted to be disposed on a ground surface, said front and rear leg members being pivotable relative to said support plate for moving between a first position, in which said lower ends of said front and rear leg members are moved away from each other, and a second position, in which said lower ends of said front and rear leg members are moved toward each other;

each of said front and rear leg members has a horizontal rod extending in a transverse direction transverse to said longitudinal direction, and two upright rods extending downwardly and respectively from two opposite ends of said horizontal rod, a cook unit disposed removably on said support plate and supported by said support unit when said front and rear leg members are disposed in the first position; said support plate and said front and rear leg members cooperatively defining an accommodating space thereamong for receiving said cook unit when said cook unit is removed from said support plate; and said cook unit including a cook base and a top cover for covering said cook base, said cooking base having an outer wall surface formed with a pair of first positioning grooves which engage respectively and removably said upright rods of one of said front and rear leg members when said cook unit is removed from said support plate and when said front and rear leg members are retained in said second position, said top cover having an outer wall surface formed with a pair of second positioning grooves which engage respectively and removably said upright rods of the other one of said front and rear leg members when said cook unit is removed from said support plate and when said front and rear leg members are retained in said second position a retaining unit having a first end mounted on one of said front an rear leg members and a second end opposite to said first end, said second end of said retaining unit engaging releasably the other one of said front and rear leg members when said front and rear leg members are moved to the second position, thereby retaining said front and rear leg members at said second position.

6. A barbecue device comprising:

a support unit including a horizontal support plate with front and rear end portions which are opposite to each other in a longitudinal direction, and front and rear leg members, each of said front an rear leg members having an upper end mounted pivotally on a respective one of said front ad rear end portions of aid support plate for pivoting about a respective horizontal axis transverse to said longitudinal direction, and a lower end adapted to be disposed on a ground surface, said front and rear leg members being pivotable relative to said support plate for moving between a first position, in which said lower ends of said front and rear leg members are moved away from each other, and a second position, in which said lower ends of said front and rear leg members are moved toward each other;

said support plate has a bottom side formed with a parallel pair of slide channels that extend in the longitudinal direction between said front and rear end portions of said support plate, said barbecue device portions of said support plate, said barbecue device further comprising a handle frame which includes a parallel pair of slide rods and a handle bar extending between and interconnecting said slide rods, each of said slide rods extending slidably into a respective one of said slide channels such that said handle frame is slidable relative to said support plate between a retracted position, in which said slide rods are retracted into said slide channels and said handle bar is disposed adjacent to said front end portion of said support plate, and an extended position, in which said slide rods extend forwardly from said slide channels and said handle bar is disposed distal from said front end portion of said support plate, said barbecue device further comprising a retaining rod which is secured to said bottom side at said first end portion of said support plate and which extends in the transverse direction, each of said slide rods being formed with an elongated slot that extends along length of the respective one of said slide rods, said retaining rod extending through said elongated slots in said slide rod to prevent removal of said handle frame from said support plate during movement of said handle frame to the extended position;

a cook unit disposed removably on said support plate and supported by said support unit when said front and rear leg members are disposed in the first position;

said support plate and said front and rear leg members cooperatively defining an accommodating space thereamong for receiving said cook unit when said cook unit is removed from said support plate; and a retaining unit having a first end mounted on one of said front an rear leg members and a second end opposite to said first end, said second end of said retaining unit engaging releasably the other one of said front and rear leg members when said front and rear leg members are moved to the second position, thereby retaining said front and rear leg members at said second position.

7. The barbecue device as claimed in claim 6, further comprising a wheel unit mounted on said lower end of said front leg member and adapted to be in rolling contact with the ground surface.

* * * * *